Oct. 14, 1952   G. W. SODERMAN   2,613,484
GRINDING FIXTURE
Filed May 6, 1949   3 Sheets-Sheet 1

INVENTOR
G. W. SODERMAN
BY
W. C. Parnell
ATTORNEY

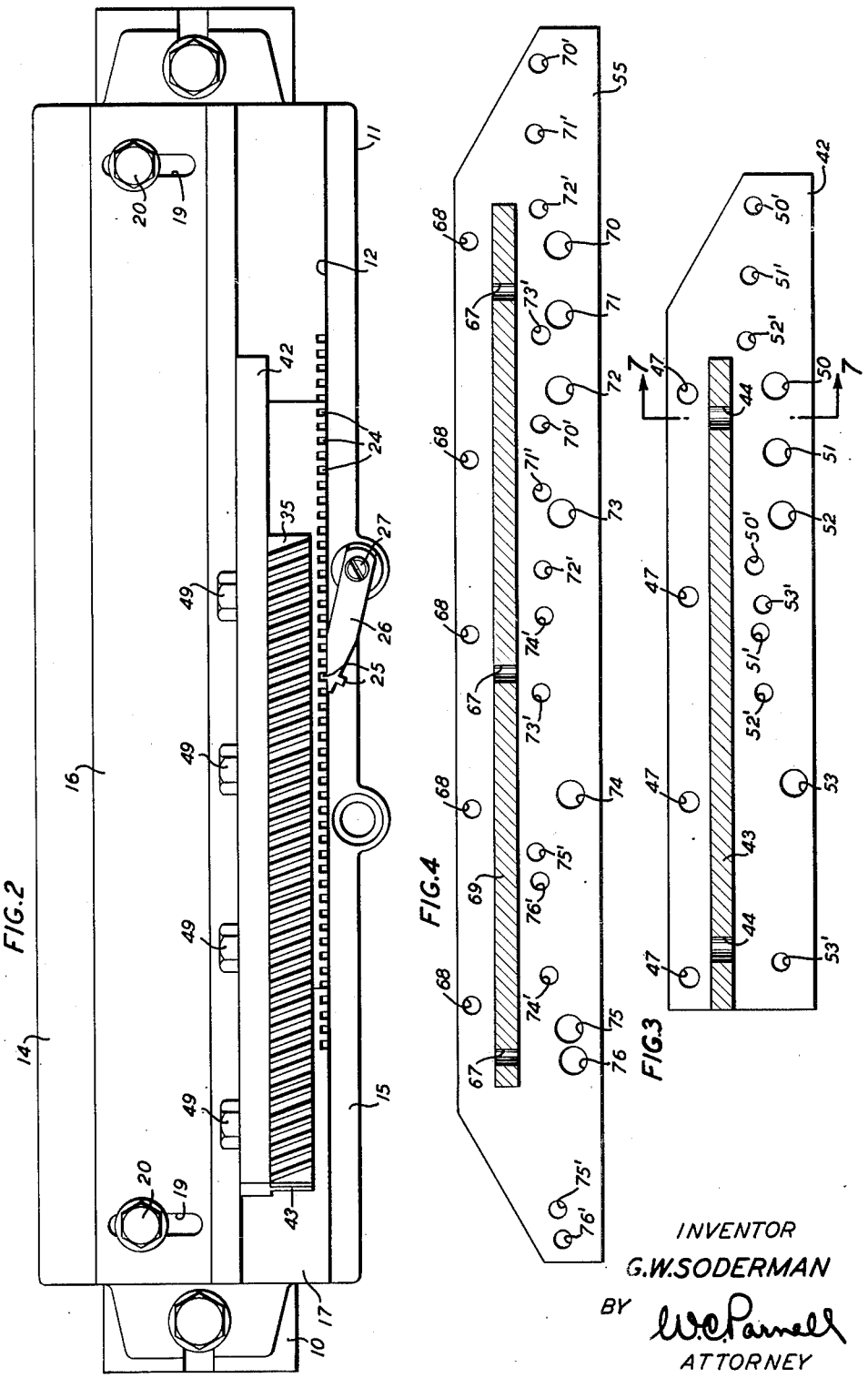

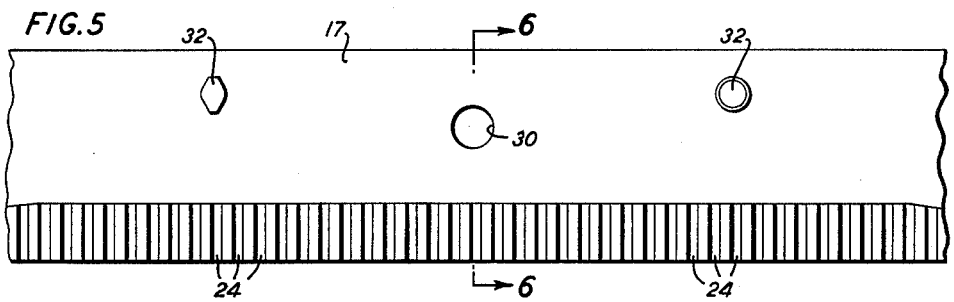
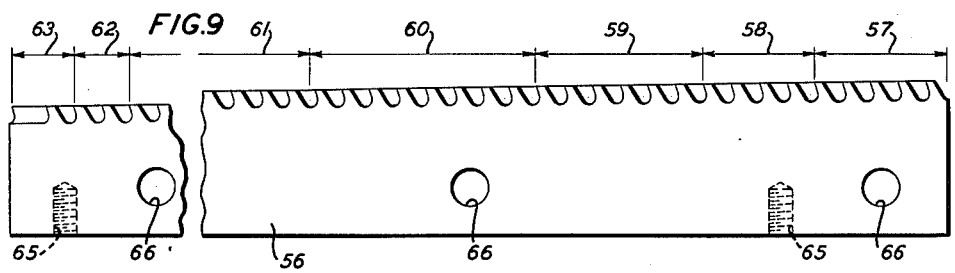
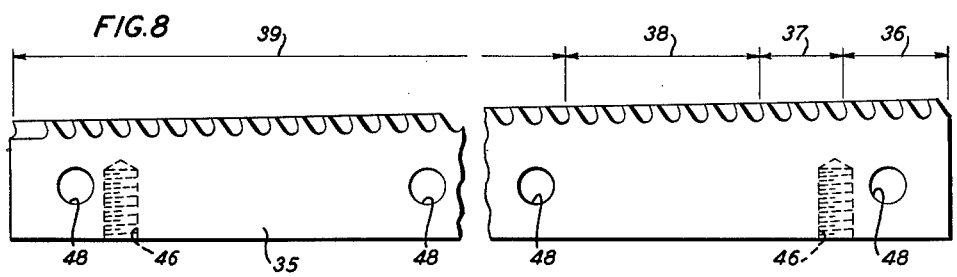
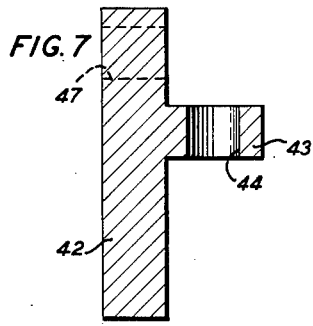
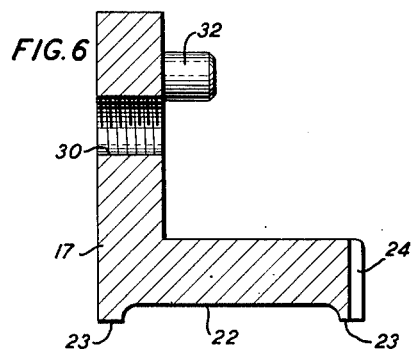

Patented Oct. 14, 1952

2,613,484

UNITED STATES PATENT OFFICE 2,613,484

GRINDING FIXTURE

George W. Soderman, West Englewood, N. J., assignor to Western Electric Company, Incorporated, New York, N. Y., a corporation of New York Application May 6, 1949, Serial No. 91,727

2 Claims. (Cl. 51—216)

This invention relates to grinding fixtures, and more particularly to fixtures for use in grinding broaches.

Broaches vary in length and in sets of cutting teeth disposed at varied angular positions relative to each other, depending upon the material to be cut thereby, and more particularly the depth of cut to be made in the material. The efficient life of a broach is somewhat short due to the exceedingly heavy work it is to perform and for this reason, it is advantageous to sharpen the broach for further use. To sharpen the broach accurately, that is, to sharpen the individual cutting teeth of each set, the broach must be positioned accurately at different angular positions with respect to the grinding wheel.

An object of the invention is to provide and article grinding fixture which is simple in structure and readily adaptable for efficiently supporting articles of varied contours relative to a grinding wheel for grinding the articles.

In the present embodiment of the invention, the grinding fixture includes a carriage movable in a given path on a table relative to a fixed position grinding wheel, and a holder for an article to be secured at varied positions on the carriage depending upon varied contours of surfaces of the article to be ground.

More particularly, the carriage has a hole tapped for a mounting screw and on each side thereof, a supporting pin to receive holders for articles, such as broaches, to be ground at various angles over different portions of their lengths. Each holder has a set of apertures for each grinding angle so that a broach mounted in one of the holders can be quickly and accurately adjusted to the desired angles merely by using the sets of apertures successively to secure the holder to the carriage.

Other objects and advantages will be apparent from the following detailed description when considered in conjunction with the accompanying drawings, wherein Fig. 1 is a fragmentary front elevational view of a grinding machine employing the grinding fixture;

Fig. 2 is a top plan view of the structure shown in Fig. 1 with the grinding wheel removed;

Fig. 3 is a vertical sectional view of the holder shown in Fig. 1;

Fig. 4 is a vertical sectional view of a holder for a larger article or broach;

Fig. 5 is a fragmentary front elevational view of the carriage;

Fig. 6 is a vertical sectional view of the carriage taken along the line 6—6 of Fig. 5;

Fig. 7 is an enlarged vertical sectional view taken along the line 7—7 of Fig. 3;

Fig. 8 is an enlarged fragmentary side elevational view of the broach shown in Figs. 1 and 2 for the holder shown in Figs. 1, 2 and 3; and Fig. 9 is an enlarged fragmentary side elevational view of a broach to be mounted on the holder shown in Fig. 4.

Figure 1:
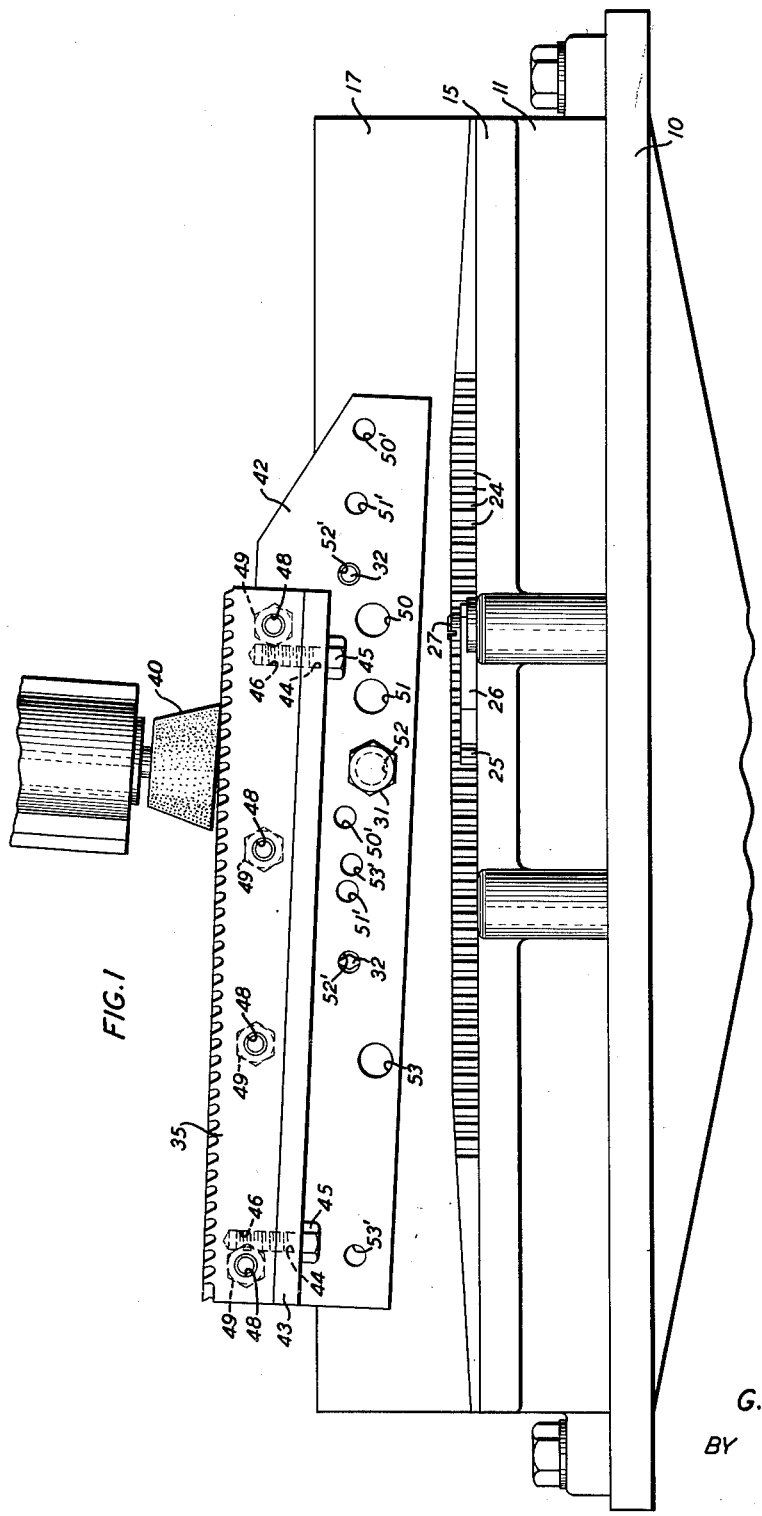

Referring now to the drawings, attention is first directed to Fig. 1 which illustrates a bed 10 of a grinding machine upon which a table 11 is mounted, the table being longitudinally grooved at 12 and having upwardly extending guides 14 and 15. A spacing element 16 (Fig. 2) is mounted in the groove 12 and is adjustable laterally therein relative to the portion 15 to vary effectively the width of the guided path for a carriage 17. The spacing element 16 has elongated apertures 19 disposed therein near its ends to receive screws 20 extending into threaded apertures of the table to lock the spacing element in any desired adjusted position.

Attention is directed to Fig. 6 which illustrates the cross-sectional contour of the carriage 17, it being substantially L-shaped and having a cutaway portion 22 providing legs 23 upon which the carriage rests in the groove 12 to minimize the element of friction as the carriage is moved longitudinally in its guided path. A series of notches 24 is formed in the forward edge of the carriage 17 to receive either one of the projections 25 of a latch 26 to lock the carriage at successive positions during the grinding of the cutting teeth of the broaches, these notches being spaced given distances corresponding to the distances between the edges of the cutting teeth of the broaches to be ground. The latch 26 is pivoted at 27 on the table 11 or the portion 15 thereof. The carriage is also provided with a threaded aperture 30 for receiving a mounting screw 31. Locating pins 32 are disposed equal distances upon each side of the aperture 30 to be receivable in sets of apertures in holders such as shown in Figs. 3 and 4.

In the present embodiment of the invention, the article 35 being ground, as illustrated in Fig. 1, is a broach, shown more in detail in Fig. 8. This particular broach includes four sets of cutting teeth 36, 37, 38 and 39 disposed at known angles with respect to each other. To sharpen the sets of cutting teeth, it is necessary that they be supported relative to a grinding element 40 at known angles with respect to the plane of the table. The grinding wheel 40 of the grinding machine is of the conventional type employed for grinding broaches and although it may be moved vertically into and out of grinding position and may be adjusted for the know angular relationship of the cutting edges, it is defined as being disposed at a fixed position during the grinding operations.

A holder 42 for the broach 35 is shown in detail in Fig. 3 and includes a shelf 43 upon which the article or broach 35 may be mounted. The shelf has apertures 44 therein to receive the conventional mounting screws 45, receivable in the threaded apertures 46 of the broach, which are used in mounting the broach in the machine where it is to perform its cutting operations. Apertures 47 are also formed in the holder 42 to register with threaded apertures 48 of the broach 35 to receive other mounting screws 49 to firmly secure the broach at a given position on the shelf of the holder. The holder 42 is provided with four sets of apertures to correspond with the aperture 30 and the pins 32 of the carriage, these sets of apertures being spaced relative to each other in the holder comparable to the relative positions of the sets of cutting teeth 36 to 39, inclusive. The set of apertures 50 and 50' are for the set of teeth 36, the set of apertures 51 and 51' are for the set of teeth 37, the set of apertures 52 and 52' are for the set of teeth 38 and the set of apertures 53 and 53' are for the set of teeth 39.

The holder 55 shown in Fig. 4 is for the article or broach 56 shown in Fig. 9, this broach having seven sets of teeth identified by reference numerals 57 to 63, inclusive, and including the standard threaded apertures 65 and 66 for mounting screws 45 and 49 receivable respectively in apertures 67 and 68 of the holder 55.

A similar arrangement of sets of apertures are provided in the holder 55 spaced from each other at given locations comparable to the relative positions of the sets of cutting edges 57 to 63, inclusive. A main aperture 70 and auxiliary apertures 70' are for the set of teeth 57, a main aperture 71 and auxiliary apertures 71' are provided for the set of teeth 58, a main aperture 72 and auxiliary apertures 72' are provided for the set of teeth 59, a main aperture 73 and auxiliary apertures 73' are provided for the set of teeth 60, a main aperture 74 and auxiliary apertures 74' are provided for the set of teeth 61, a main aperture 75 and auxiliary apertures 75' are provided for the set of teeth 62, and a main aperture 76 and its auxiliary aperture 76' are provided for the set of teeth 63.

Considering now the function of the fixture, let it be assumed that the article or broach 35 is to be ground. The holder 42 for this broach is selected and the broach is mounted on the shelf 43 thereof. When this step has been taken, it will be known that the sets of cutting teeth 36 to 39, inclusive, of the broach are disposed at given angular positions relative to their sets of locating apertures in the holder. The operator first mounts the holder with the broach on the pins 32 of the carriage. With the pins 32 extending through the apertures 50' and the main aperture 50 being aligned with the threaded aperture 30, the mounting screw 31 is then extended through the aperture 50 and rotated in the threaded aperture 30 until the holder is firmly mounted on the carriage. The broach is now accurately positioned relative to the grinding wheel 40 for the grinding of all of the cutting teeth in the set 36. The carriage with the holder and broach is located on the table by the aid of the latch 26 for grinding the first tooth in the set 36. Each tooth is ground by movement of the table and the objects supported thereby in a given plane by suitable means not shown. The depth of the cut by the grinding wheel may be varied by axial movement of the grinding wheel. When this has been accomplished, the carriage is moved the distance of one of the notches 24 to position the second tooth in the set 36 for grinding. This performance is repeated until the last tooth in the set 36 is ground, after which, the holder 42 with the broach 35 is removed from the carriage and again positioned thereon so that the apertures 51' will register with the pins 32 and the main aperture 51 registers with the aperture 30. The holder is again secured in place by the mounting screw 31 and the carriage adjusted step by step during the grinding of the successive teeth in the group 37. This operation is repeated for each set of cutting teeth in the broach. It is possible for this delicate operation to be performed by an inexperienced operator knowing that the teeth in each set will be accurately ground and that the angular relationship of the teeth in the various sets will be maintained. The same is true regardless of which type of article or broach is to be ground, each being provided with a holder with a series of apertures which constitute means for mounting the article or broach at varied angular positions on the carriage relative to the grinding wheel, these angular position corresponding to the varied angular positions of the sets of cutting edges of the article or broach to be ground.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A broach grinding fixture, for use in a grinding machine having a table mounted in a given plane relative to a rotatable grinder, the fixture comprising a holder having sets of apertures therein corresponding in number and relative positions to the number of sets of teeth and their relative angular positions of a broach to be ground, means to removably secure the broach to the holder, a carriage supported for movement on the table, means mounted on the table to guide the carriage in a given path relative to the grinder and parallel with the plane of the table, and supporting elements for the holder mounted on the carriage and receivable in any one of the sets of apertures of the holder whereby the holder with the broach may be removably supported successively in various angular positions relative to the plane of the table and grinder to cause grinding of the sets of teeth of the broach to given angles relative to each other during movement of the carriage with the holder and broach.

2. A broach grinding fixture, for use in a grinding machine having a table mounted in a given plane relative to a rotatable grinder, the fixture comprising a holder having sets of apertures therein corresponding in number and relative positions to the number of sets of teeth and their relative angular positions of a broach to be ground, means to removably secure the broach to the holder, a carriage supported for movement on the table, means mounted on the table to guide the carriage in a given path relative to the grinder and parallel with the plane of the table, and supporting elements for the holder mounted on the carriage and receivable in any one of the sets of apertures of the holder whereby the holder with the broach may be removably supported successively in various angular positions relative to the plane of the table and grinder to cause grinding of the sets of teeth of the broach to given angles relative to each other during movement of the carriage with the holder and broach, notches cut in the carriage at predetermined positions relative to the sets of apertures therein, and a locating member swingably carried by the table to engage the notches to position the teeth of the broach singly relative to the grinder.

GEORGE W. SODERMAN.

REFERENCES CITED

The following references are of record in the file of this patent:

UNITED STATES PATENTS

| Number | Name | Date |
|---|---|---|
| 407,577 | Cox | July 23, 1889 |
| 1,065,994 | Williams | July 1, 1913 |
| 1,304,070 | Lenz | May 20, 1919 |
| 1,729,812 | Andrews | Oct. 1, 1929 |
| 2,096,422 | Brunner | Oct. 19, 1937 |
| 2,113,287 | Baldenhofer | Apr. 5, 1938 |
| 2,151,204 | Hartman | Mar. 21, 1939 |
| 2,360,772 | Hedin | Oct. 17, 1944 |
| 2,388,785 | Gotberg | Nov. 13, 1945 |